Dec. 9, 1930.  R. E. CLEGG  1,784,269
LOCK WASHER
Filed Sept. 27, 1928
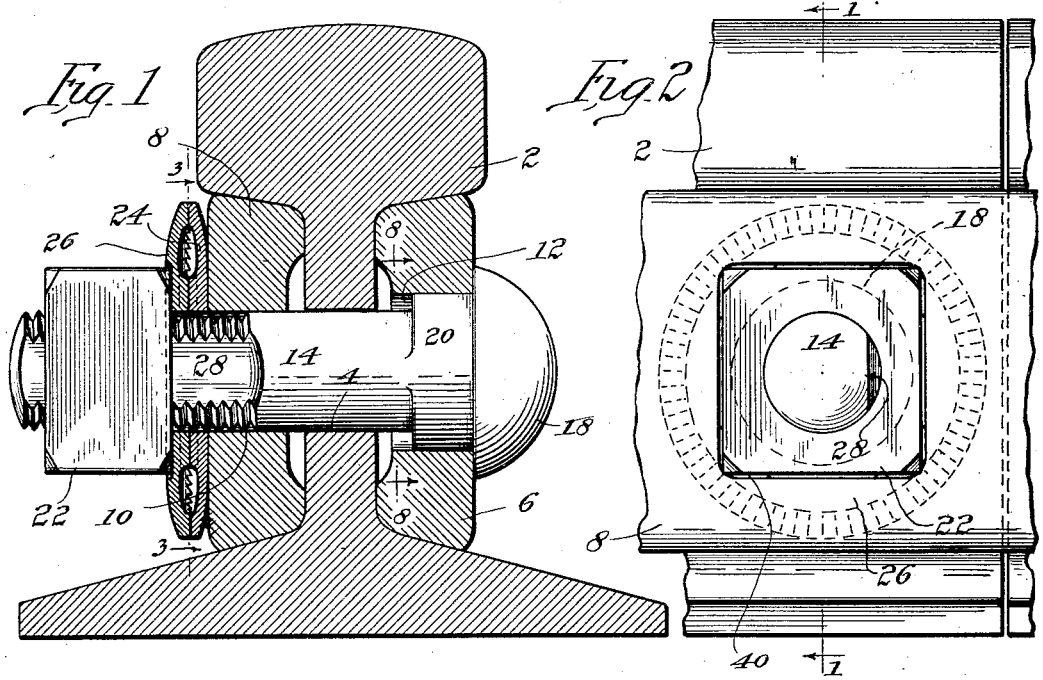
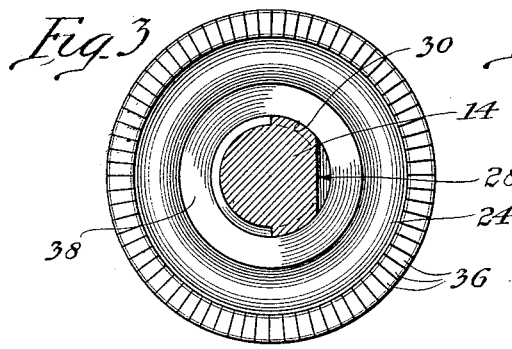
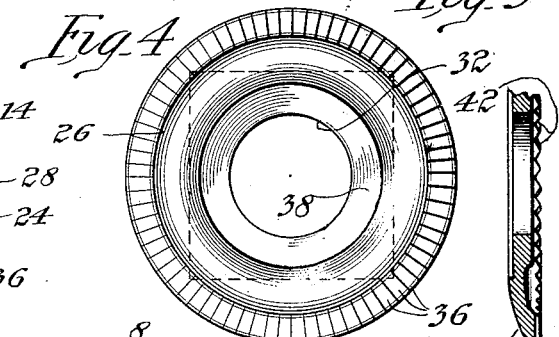
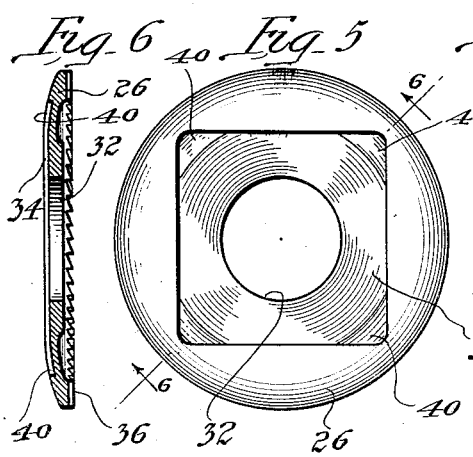
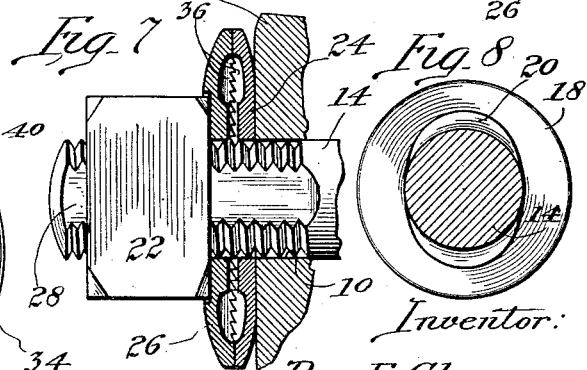
Inventor:
Roy E. Clegg
By Cheever & Cox
Attys.

Patented Dec. 9, 1930

1,784,269

UNITED STATES PATENT OFFICE

ROY E. CLEGG, OF CHICAGO, ILLINOIS, ASSIGNOR TO CLEGG LOCK WASHER CORPORATION, OF CHICAGO, ILLINOIS

LOCK WASHER

Application filed September 27, 1928. Serial No. 308,838.

This invention relates to nut locks and especially to nut locks for use in connection with the fish plates of rail joints between railroad rails.

My present invention represents an improvement over the lock washer disclosed in my Patent No. 1,654,789, dated January 3rd, 1928, and one of the primary objects of my present invention is to provide a device of the character set forth which will automatically secure a nut against unscrewing as said nut is tightened, said device including a pair of interlocking disc members which present a solid backing for the nut tightened thereagainst.

Another object of my invention is to provide effective means for securely locking a nut in position including a pair of interlocking disc members, said members being adapted to yieldingly engage each other as a nut is being tightened, flat annular surfaces being provided on the discs to effect the positive engagement of said discs so as to present a solid backing for the nut, thereby avoiding the development of deleterious internal stresses within the discs when said discs are applied to fish plates of rail joints and the like.

A still further object of my invention is to provide nut locking means of the class described which is adapted to be applied to a threaded bolt having a flat formed thereon, one of the interlocking discs or washers of my device having a non-circular aperture which serves, when said disc is associated with the bolt, to secure the disc against rotation thereon, and another disc which is rotatable upon the bolt for interlocking with the first mentioned disc when a nut is being tightened upon the bolt.

In addition to the above mentioned charactertistics my invention more specifically contemplates the provision of a nut locking means which includes a pair of interlocking discs or washers, one of said washers being counter-sunk to receive a polyhedral nut, certain portions of the washer being counter-sunk to a greater depth in order to avoid the engagement of the corner portions of the clamping surface of the nut with the disc, thereby enabling the disc to experience uniform resiliency along the entire margin thereof.

A still further object of my invention is to provide a nut locking device which may be readily applied to a threaded bolt without mutilating any of the threads thereon, said device comprising a pair of dished washers having interlocking marginal teeth, one of the washers being non-rotatable with respect to the bolt, the other washer being rotatable in response to the tightening of a nut, said discs having sufficient marginal resiliency to effect the proper clamping engagement thereof, the teeth formed on the discs having an angular contour which will positively secure a nut in position but which will in turn not prevent said nut from being unscrewed when sufficient unthreading force is applied thereto.

These and other objects will be apparent from the following detailed description when considered in connection with the accompanying drawing, wherein—

Figure 1 is a transverse vertical section taken along the line 1—1 of Figure 2 through a rail and cooperating fish plates, illustrating one embodiment of my present invention applied thereto;

Figure 2 is a fragmentary side elevational view of a rail joint as viewed from the left of Figure 1;

Figure 3 is a vertical sectional view taken transversely of the bolt along the line 3—3 of Figure 1;

Figure 4 is a view of the inner surface of the disc or washer adapted to be clamped against the disc disclosed in Figure 3;

Figure 5 is a face elevational view of the outer locking washer or disc shown in Figure 4;

Figure 6 is a transverse sectional view of the outer locking washer taken along the line 6—6 of Figure 5;

Figure 7 is a fragmentary transverse sectional view similar to Figure 1 disclosing the position occupied by the locking washers just previous to the interlocking engagement thereof;

Figure 8 is a transverse sectional view of the bolt detached from the fish plates taken on the line 8—8 of Figure 1; and Figure 9 is a transverse sectional view of an outer washer similar to Figure 6, provided with an alternative or modified form of interlocking teeth which will permit the washer to be disengaged in response to the application of a sufficient unscrewing force against the nut associated therewith.

Referring now to the drawing in detail wherein like numerals have been employed to designate similar parts throughout the figures, it will be observed I have disclosed for purposes of illustration a rail 2 of standard form which is provided with the usual bolt hole 4 formed in the web thereof. On each side of the abutting ends of a pair of these rails 2 are fish plates 6 and 8 and it will be observed that I provide the fish plate 8 with the usual circular bolt hole 10 and the plate 6 with an elliptical opening 12, these openings serving to receive a bolt 14.

This bolt 14 is provided with the usual shank and a head 18 and adjacent said head is an enlarged elliptical portion 20 which is adapted to be received by the elliptical opening 12 in the fish plate 6. By having the elliptical arrangement of the opening 12 and the portion 20 of the bolt 14, said bolt is secured against rotation in response to the tightening thereon of a nut 22.

Prior to the application of the nut 22 I apply a pair of interlocking dished washers or discs 24 and 26. In this connection it will be observed that I provide the threaded portion of the bolt 14 with a flat surface 28 and the washer 24 with a non-circular aperture 30, Figure 3. Thus it will be apparent that the washer 24 is non-rotatable with respect to the bolt 14. The washer 26 however is provided with a circular aperture 32 and the outer surface thereof is provided with a recess 34 for receiving the nut 22. Outer marginal engaging surfaces of the washers 24 and 26 are formed with teeth 36. Annular groves 37 are arranged substantially intermediate the sides of the openings 30 and 32 and the outer edges of the washers 24 and 26. That part of each washer lying between the center aperture and the annular groove forms an annular surface 38 to provide a solid backing for a tightened nut. The annular groove 37 causes that part of the washer which lies outside of the groove to be springy or resilient so that the outer marginal edges of the washers will give as the teeth ride over each other. It will be observed from Figures 6 and 7 wherein I have disclosed the washers prior to the clamping or interlocking thereof, that the annular surfaces 38 normally lie in a plane which is parallel to but not coincident with the outer portions of the teeth 36. Hence, when said washers are clamped together and completely interlocked as shown in Figure 1, the marginal portions of said washers must yield in order to permit the engagement of the annular surfaces 38. This resiliency of the marginal portion of the washers is sufficient to maintain the effective clamping engagement of the teeth 36 when said washers are secured in position and the engagement of the surfaces 38 provides a very solid backing for the nut 22. By having this solid backing I have been able to reduce to a minimum deleterious results which are sometimes occasioned in response to the rail vibrations to which the locking washers are subjected over an extended period of time. In other words, any vibration to which the rail 2 may be subjected will not cause longitudinal movement of the bolt 14 because of the solid backing which is presented by the engagement of annular surfaces 38. In this way I have precluded the possibility of breakage in the marginal resilient portions of the washers from crystallization or internal stresses which sometimes result when yieldable materials such as dished lock washers are subjected to continued vibrations.

Referring to Figures 5 and 6 it will be noted that corner portions 40 have been recessed to a greater depth than other portions thereof and the reason for forming these depressed portions 40 will be apparent when it is understood that I desire to have entire marginal portion of the washer 26 uniformly resilient. If I did not provide these depressed portions 40 within the recess 34, the corner portions of the clamping surface of the nut 22 would engage the washer 26 at points which approach the outer margin of the washer. At such points or positions the marginal resiliency of the washer would be considerably less than the marginal resiliency of the portions opposite the medial portions of the flat sides of the nut. However, by providing these depressed portions 40, the corners of the clamping surface thereof are ineffective and hence the marginal resiliency of the washer at these points is substantially the same as the marginal resiliency opposite the sides of the nut. In this manner I am able to obtain uniform clamping action between all of the engaging teeth 36 of the washers, thereby expediting the locking effectiveness thereof. In addition to forming the depressed corners 40 in some instances I also chamfer the corners of the nut 22 as clearly shown in Figure 1. In Figure 9 I have disclosed the washer 24 provided with a modified or alternative form of teeth 42. These teeth 42 are formed at an angle of substantially forty-five degrees and it will be obvious that by forming teeth in this manner I am able to back off the nut 22 by the application of sufficient force thereto when it is desired to detach the fish plates 6 and 8 from the rail. In other words, my invention is not limited to dished locking washers formed with teeth having any particular contour, and in fact my invention contemplates the use of teeth which are formed in accordance with the particular device with which they are to be employed.

From the foregoing it will be observed that my invention provides a very effective as well as an economically constructed means for securing a nut against unscrewing. In applying my improved locking device it is only necessary to thread the bolt 14 through the elliptical opening 12 and the hole 10 formed respectively in the fish plates 6 and 8 and then apply the washers 24 and 26. After the nut 22 has been screwed upon the bolt until the outer washer 26 is reached, said nut is seated within the recess 34 of the washer and the tightening of the nut continued. It will be observed that as the tightening of the nut within the washer 26 is begun, the annular surfaces 38 of the washers are spaced apart but as the tightening of the nut continues, the ratchet-like teeth 36 click past each other and the annular surfaces are carried into contact with each other. The groove 37 gives resiliency to the marginal portions of the washers and causes the teeth to make a firm clamping engagement while engagement of the annular surfaces 38 presents a solid abutment for the nut 22. In this connection it is suggested that my invention is not limited to the use of washers, both of which are dished, but contemplates the use of a pair of washers in which only one of said pair is dished or recessed. In other words, the resiliency may reside in one of the washers as distinguished from Figure 1 wherein I have disclosed both of the washers as being formed with marginal resilient portions. As already suggested, by forming the recess 34 with corner depressions 40, I have been able to obtain uniform resilient characteristics throughout the entire marginal portion of the outer washer and by forming the teeth in said washers as shown in Figure 9, I am able to back off the nut when desired in response to the application thereto of sufficient unscrewing force. From the foregoing it is to be understood that by the use of my improved nut locking means I have reduced to a minimum injurious results from internal stresses which have heretofore been caused by rail vibrations and in this way have greatly expedited the interconnecting of rails and the like.

Although I have disclosed my improved nut locking device in connection with fish plates of rails, it is to be understood that this is merely representative of one of many instances wherein my invention is applicable and although I have disclosed specific structural characteristics, it is to be understood that my invention is capable of certain modifications and changes without departing from the spirit and scope thereof and therefore should be limited only by the scope of the appended claims.

Having thus described my invention what I claim as new and desire to secure by Letters Patent is:

1. A nut lock for a bolt and nut tightening means including a pair of interlocking washers, one of said washers being dished inwardly toward its companion washer and having a resilient outer edge to effect a yielding engagement between interlocking portions of the washers, teeth on said washers, both of said washers being provided with integral engaging surfaces inwardly of said teeth to present a solid backing for a nut tightened thereagainst, said engaging surfaces being substantially in the same horizontal plane as the inner marginal surfaces of said washers, means for causing engagement of one washer with the nut, and means for maintaining a companion washer stationary relative to the bolt.

2. A nut lock for tightening means comprising a bolt and a nut, a pair of interlocking washers, one of said washers being concavo-convex and having an annular groove inwardly of the marginal edges of the washers to render the same resilient and thereby effect a yielding engagement between interlocking portions of the washers, and an integral abutment formed on one of said washers inwardly of said groove for engagement with a surface of the companion washer to present a rigid backing for a tightened nut, means for causing one washer to rotate with the nut, and means for preventing rotation of the other washer on the bolt.

In witness whereof, I have hereunto subscribed my name.

ROY E. CLEGG.